No. 854,877. PATENTED MAY 28, 1907.
J. DOVE-SMITH & F. E. LAUER.
ANTIFRICTION BEARING.
APPLICATION FILED OCT. 24, 1906.
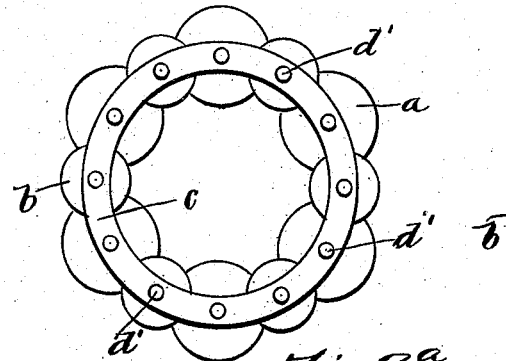
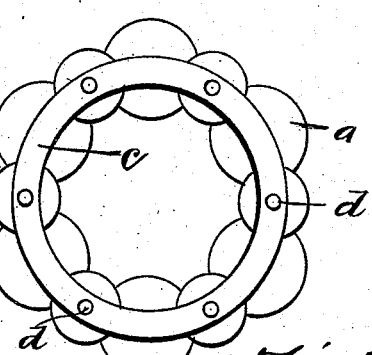
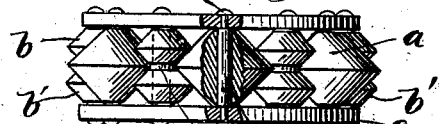
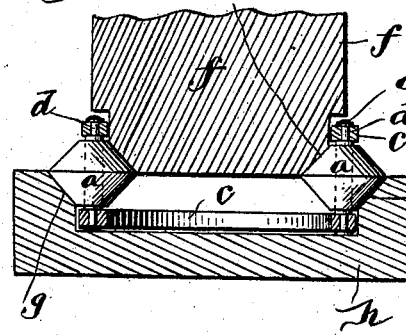
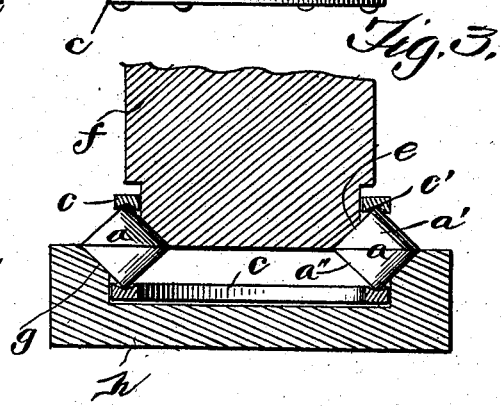
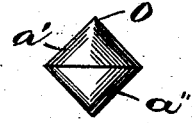
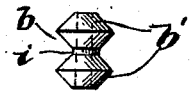

UNITED STATES PATENT OFFICE.

JOSEPH DOVE-SMITH, OF TORONTO JUNCTION, AND FRANK EDWARD LAUER, OF NIAGARA FALLS, ONTARIO, CANADA.

ANTIFRICTION-BEARING.

No. 854,877.      Specification of Letters Patent.      Patented May 28, 1907.

Application filed October 24, 1906. Serial No. 340,384.

*To all whom it may concern:*

Be it known that we, JOSEPH DOVE-SMITH, of the town of Toronto Junction, in the county of York and Province of Ontario, Dominion of Canada, and FRANK EDWARD LAUER, of the city of Niagara Falls, in the county of Welland and said Province of Ontario, have invented certain new and useful Improvements in Antifriction-Bearings; and we hereby declare that the following is a full, clear, and exact description of the same.

This invention relates to an anti friction bearing capable of use as an end, thrust or foot-step, bearing for any kind of shafting or axle, and it consists essentially of a series of load-bearing rollers, each having two conical bearing surfaces tapering from the middle of its peripheral surface toward the ends thereof, a series of spacing rollers, intermediate the load-bearing rollers, each having its ends tapered to correspond with the taper of the conical surfaces of the load-bearing rollers and a V-shaped groove extending from the inner edges of its tapered ends to the median line of its peripheral surface with the apex of the V-shaped groove alined with the apex of the conical surface of the adjacent load-bearing roller, a retaining ring at each end of the load-bearing and spacing rollers and fastening bolts locking the retaining rings together, as hereinafter more fully set forth and more particularly pointed out in the appended claims.

For a full understanding of the invention reference is to be had to the following description and to the accompanying drawings, in which, Figure 1 is a plan view, of the anti friction bearing showing the retaining rings, load-bearing and spacing rollers and fastening bolts. Fig. 1$^a$ is a plan view of a modification of the construction shown in Fig. 1. Figs. 2 and 2$^a$ are side elevations, partly in section of the anti-friction bearing shown in Figs. 1 and 1$^a$. Fig. 3 is a vertical section through the anti-friction bearing, shown in Fig. 1., combined with a shaft or axle and the load-resisting element. Fig. 3$^a$ is a sectional view of the construction shown in Fig. 1$^a$. Fig. 4 is a detail view of one of the load-bearing rollers shown in Fig. 2. Fig. 4$^a$ is a detail view of one of the load-bearing rollers shown in Fig. 2$^a$. Fig. 5 is a detail view of one of the spacing rollers.

Like letters of reference refer to like parts throughout the specification and drawings.

The anti friction bearing shown in the accompanying drawings is particularly designed for end, thrust, and foot step bearing purposes and may be described as consisting essentially of a series of load bearing rollers $a$, a series of spacing rollers $b$, intermediate the load bearing rollers, a retaining ring $c$ at each end of the load bearing and spacing rollers and fastening bolts $d$ securely locking the retaining rings together.

The peripheral surface of each load bearing roller $a$ has the shape of two cones $a'$, $a''$, tapering from the middle of its peripheral surface toward the ends thereof at an angle preferably of forty-five (45°) degrees to contact respectively the correspondingly shaped surface $e$ of the shaft $f$ and the correspondingly shaped contacting surface $g$ of the load resisting element $h$ with which the load bearing rollers co-act in the performance of their functions.

As shown in the drawings the load bearing rollers $a$ are separated by intervening spaces in which are located the spacing rollers $b$, the ends $b'$ of which are tapered to correspond with the taper of the conical surfaces $a'$, $a''$ of the load bearing rollers $a$, and extending from the inner edges of the tapered ends $b'$ to the median lines of the peripheral surfaces are V-shaped grooves $i$, the angularity or slope of the faces of which corresponds to that of the conical faces of the load bearing rollers. Located at the ends of the load bearing and spacing rollers, are retaining rings $c$ tied together by fastening bolts $d$.

As shown in Figs. 2 and 3, the apices $o$ of the cone shaped ends of the load bearing rollers are journaled in conical seats $c'$ in the retaining rings, and the fastening bolts $d$ are passed through the central bores $j$ of the spacing rollers and through the retaining rings, to which they are secured preferably by nuts or rivets heads $d'$ to securely hold the load bearing and spacing rollers in their assembled condition, but as shown in Figs. 2$^a$ and 3$^a$, the load bearing and spacing rollers are centrally bored and the fastening bolts are passed through their central bores and through the retaining rings.

When the anti friction bearing is operatively employed the cone surfaces $a'$ of the load bearing rollers *a* engage with the cone surface *e* of the shaft *f* and the cone surfaces *a''* of the load bearing rollers engage with the correspondingly tapered cone surface *g* of the load resisting element *h*. The cone surfaces *a'* constitute the bearing for the end of the shaft *f* and provide it with an anti friction raceway during its revolution and the load resisting element *h* maintains the load bearing rollers positioned against the contacting surface of the shaft *f*, sustains the load thereon and receives the impact caused by the end thrust of the shaft.

By the employment of the spacing rollers and their contact with the load bearing rollers, the displacement of the latter under the influence of the load is not only resisted, but an excess of load on one of the load bearing rollers can be evenly distributed to the adjoining rollers.

The tapered ends of the spacing rollers do not engage the contacting surface of the shaft or the load resisting element and consequently are not influenced either by the load imposed on the load bearing rollers or the thrust against the load resisting element and are constantly free to perform their function of maintaining the load-bearing rollers evenly spaced.

The conical bearing surfaces of the shaft and resisting element, contact the load bearing rollers at diametrically opposite and parallel places on opposite sides of the middle of the peripheral surfaces of the load bearing rollers to equalize the strains on the opposite sides of their longitudinal axes, so that they will constantly revolve in fixed planes, without straining the parts of the anti friction bearing or increasing the friction thereof.

Having thus fully described our invention what we claim as new and desire to secure by Letters Patent is:

1. An anti friction bearing for end, thrust and step bearing purposes, comprising a series of load bearing rollers each having two conical bearing surfaces tapering from the middle of its peripheral surface toward the ends thereof, a series of spacing rollers intermediate the load bearing rollers, each having its ends tapered to correspond with the taper of the conical surfaces of the load bearing rollers, and having a V-shaped groove extending from the inner edges of the tapered ends to the median line of its peripheral surface with the apex of the V-shaped groove alined with the apex of the conical surface of the adjacent load bearing roller, a retaining ring at each end of the load bearing and spacing rollers and fastening bolts locking the retaining rings together to hold the load bearing and spacing rollers in their assembled condition.

2. An anti friction bearing for end, thrust and step-bearing purposes, comprising a series of load bearing rollers each having two conical bearing surfaces tapering from the middle of its peripheral surface toward the ends thereof, a series of spacing rollers intermediate the load bearing rollers, each having its ends tapered to correspond with the taper of the conical surfaces of the load bearing rollers and having a V-shaped groove extending from the inner edges of the tapered ends to the median line of its peripheral surface with the apex of the V-shaped groove alined with the apex of the conical surface of the adjacent load bearing roller, a retaining ring at each end of the load bearing and spacing rollers and fastening bolts passing through the retaining rings and centrally through their respective load bearing and spacing rollers.

3. An anti friction bearing for end, thrust and step bearing purposes, comprising a series of load bearing rollers each having two conical bearing surfaces tapering from the middle of its peripheral surface toward the ends thereof, a series of spacing rollers intermediate the load bearing rollers, each having its ends tapered to correspond with the taper of the conical surfaces of the load bearing rollers, and having a V-shaped groove extending from the inner edges of the tapered ends to the median line of its peripheral surface with the apex of the V-shaped groove alined with the apex of the conical surface of the adjacent load bearing roller, a retaining ring at each end of the load bearing and spacing rollers and fastening bolts locking the retaining rings together to hold the load bearing and spacing rollers in their assembled condition, in combination with a shaft having a conical bearing surface contacting the conical bearing surfaces at one side of the middle of the load-bearing rollers, and tapered to correspond with the taper thereof and a load resisting element having a conical bearing surface contacting the conical bearing surfaces, at the other side of the middle of the load bearing rollers, at a place diametrically opposite and parallel to the place of contact of the conical bearing surface of the shaft.

4. An anti friction bearing for end, thrust and step bearing purposes, comprising a series of load bearing rollers each having two conical bearing surfaces tapering from the middle of its peripheral surface toward the ends thereof, a series of spacing rollers intermediate the load bearing rollers, each having its ends tapered to correspond with the taper of the conical surfaces of the load bearing rollers and having a V-shaped groove extending from the inner edges of the tapered ends to the median line of its peripheral surface with the apex of the V-shaped groove alined with the apex of the conical surface of the adjacent load bearing roller, a retaining ring at each end of the load bearing and spacing rollers and fastening bolts passing through the retaining rings and centrally through their respective load bearing and spacing rollers, in combination with a shaft having a conical bearing surface contacting the conical bearing surfaces at one side of the middle of the load bearing rollers, and tapered to correspond with the taper thereof, and a load resisting element having a conical bearing surface contacting the conical bearing surfaces at the other side of the middle, of the load bearing rollers at a plane diametrically opposite and parallel to the place of contact of the conical bearing surface of the shaft.

Toronto, October 5th A. D. 1906.

JOSEPH DOVE-SMITH.
FRANK EDWARD LAUER.

Signed in the presence of—
H. L. TRIMBLE,
O. A. BATEMAN.